July 18, 1967  N. J. BURGER ETAL  3,331,944
PLUG-IN HEATING ELEMENT ASSEMBLY
Filed March 2, 1965

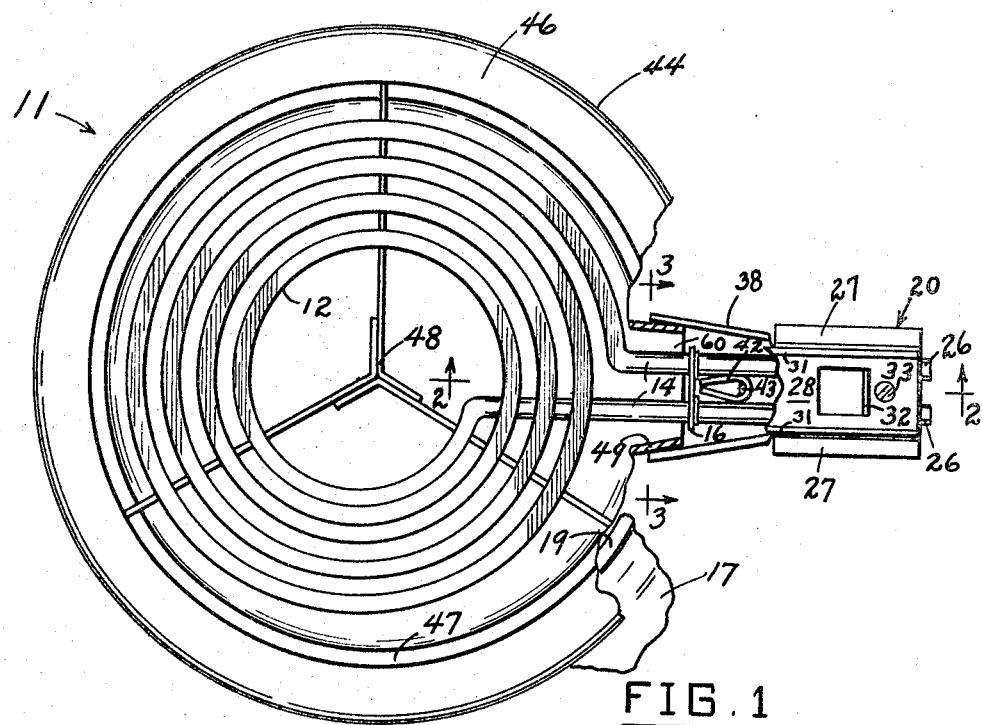

INVENTORS
NICHOLAS J. BURGER
GERALD L. GRIFFIN
EBERHARD W. MENG
BY Herman L. Gordon
ATTORNEY United States Patent Office 3,331,944
Patented July 18, 1967

3,331,944
PLUG-IN HEATING ELEMENT ASSEMBLY
Nicholas J. Burger, Silver Spring, and Gerald L. Griffin, Burtonsville, Md., and Eberhard W. Meng, Washington, D.C., assignors to Electro-Therm, Inc., Laurel, Md.
Filed Mar. 2, 1965, Ser. No. 443,455
11 Claims. (Cl. 219—455)

ABSTRACT OF THE DISCLOSURE

An electric stove heating element, reflector pan and socket assembly wherein the socket is mounted beneath the top panel of the stove adjacent an opening intended to receive the reflector pan and heating element. The socket has an inwardly projecting, upwardly facing guide channel. The reflector has a side opening provided with a flange which can seat in the socket guide channel to automatically orient the side opening of the reflector pan into registry with the socket. The guide channel has an upstanding resilient grounding sleeve receivable between the end portions of the heating element terminal legs when the terminals of the heating element are inserted in the socket.

This invention relates to electrical heating units, and more particularly to a heating unit assembly adapted for use in a counter-top type of electric stove.

A main object of the invention is to provide a novel and improved electrical heating unit assembly for an electric stove, said assembly involving relatively simple components, being easy to install, and being arranged so that the parts thereof may be easily removed and replaced, as may be required for necessary cleaning or repair.

A further object of the invention is to provide an improved electrical heating unit assembly of the type including a plug-in heating element which may be readily removed at times to provide access to the remainder of the assembly for cleaning, said assembly also including a removable reflector pan, with new and improved means for obtaining proper and accurate registry of the reflector pan with other parts of the assembly when the pan is replaced after cleaning thereof.

A still further object of the invention is to provide an improved electrical heating unit assembly for use in a counter-top type of electric stove, the assembly being inexpensive to manufacture, being neat and attractive in appearance, and being durable in construction.

Further objects and advantages of the invention will become apparent from the following description and claims, and from the accompanying drawings, wherein:

FIGURE 1 is a top plan view, with parts broken away, of an improved electrical heating unit assembly constructed in accordance with the present invention.

FIGURE 2 is an enlarged vertical cross-sectional view taken substantially on line 2—2 of FIGURE 1.

FIGURE 3 is an enlarged transverse vertical cross-sectional view taken substantially on line 3—3 of FIGURE 1.

FIGURE 4 is a fragmentary horizontal plan view taken substantially on line 4—4 of FIGURE 3.

Figure 5:
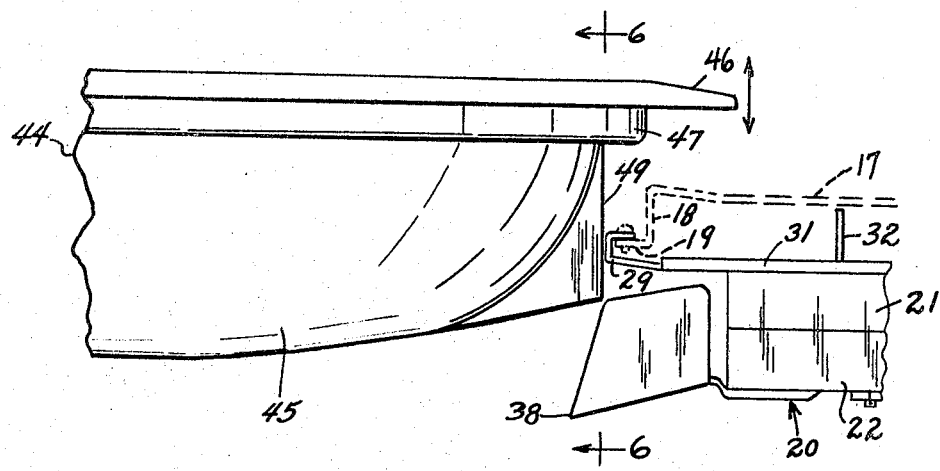
FIGURE 5 is an enlarged fragmentary side elevational view showing a reflector pan according to the present invention located with its registration collar element in a position to be engaged in the receiving channel of the associated heating element socket and illustrating how the collar element may be engaged in the channel when the pan is replaced in the assembly after cleaning.

Referring to the drawings, 11 generally designates a typical electrical heating unit assembly constructed in accordance with the present invention. The assembly comprises a plug-in heating element 12 having a plurality of substantially coplanar spirally wound horizontal coils, the coils having flattened top surfaces 13, as shown in FIGURE 2, so as to define a flat support for a cooking utensil. The heating element is provided with the parallel terminal end portions 14, 14 having the exposed contact blades 15. The parallel end portions 14, 14 are connected together by a transverse vertical plate member 16 which serves to provide a mechanical connection between said end portions and acts to securely hold said end portions in parallel relationship.

The top surface panel of the associated stove is shown at 17. The panel 17 is formed with circular apertures to receive the respective heating unit assemblies 11, each aperture being provided with a depending rim 18 having an inwardly projecting horizontal flange 19. Secured to the flange 19 is a socket, designated generally at 20.

Each socket 20 comprises identical mating blocks 21 and 22 of insulating refractory material having opposing recesses 23 in which respective female contact springs 24 are lockingly housed. The contact springs 24 define vertical longitudinal guideways to receive the respective blades 15, as shown in FIGURE 4. The springs 24 are provided at their rear portions with terminal members 25 having rearwardly exposed terminal screws 26 for connecting the associated supply wires to said terminal members.

The upper block 21 is formed with longitudinal top marginal ribs 27, 27 between which is received a longitudinally extending bracket plate 28 projecting forwardly from block 21 and terminating in a hook flange 29 which engages over the rim flange 19 and is secured thereto by a fastening screw 30. Plate 28 is formed with upstanding longitudinal side marginal stiffening flanges 31, 31, and with an upstruck intermediate transversely extending vertical stop lug 32 engageable with the bottom surface of panel 17, as shown in FIGURE 2. Behind the lug 32 a vertical fastening bolt 33 extends through plate 28, blocks 21 and 22 and through a bottom bracket plate 34 received between depending longitudinal marginal ribs 35, 35 provided on the bottom block 22. A fastening nut 37 is provided on the bottom end of bolt 33.

Bracket plate 34 is formed at its forward end with a forwardly flaring guide channel 38 which converges rearwardly toward the inwardly tapering blade-receiving openings 39 defined at the forward ends of the opposing block recesses 23. The inwardly tapering openings 39 guide the blades 15 toward engagement between the opposing leaves of the female contact springs 24, as shown in FIGURE 4.

The guide channel 38 comprises the downwardly and forwardly inclined bottom wall 40 and the upstanding forwardly divergent side walls 41, 41. Secured on the bottom wall 40 is an upstanding resilient grounding member in the form of a substantially vertical resilient thin metal sleeve 42 of substantially oval, longitudinally elongated horizontal cross-section mounted in a position to be received between and to resiliently engage the portions of the members 14, 14 located rearwardly adjacent plate 16, as shown in FIGURES 2 and 4.

Sleeve 42 is of generally oval longitudinal cross-section with a continuously curved rear bight portion 61 and resiliently contacting vertical forward edges 62, 62. Said sleeve is secured to the bottom wall 40 by an upstruck tongue 43 formed on wall 40 and welded to the inside surface of the bight portion 61, said tongue being located substantially in the vertical plane of symmetry of the sleeve.

When the portions 14, 14 are engaged on opposite sides of sleeve 42, as shown in FIGURE 1, the sleeve is placed under spring tension and exerts a resilient frictional holding force on the portions 14, 14, as well as providing a secure grounding connection to said portions.

Designated at 44 is a removable metal reflector pan which is shaped to fit in the heater element aperture in panel 17, said pan comprising a bowl-shaped main body 45 having an annular integral top rim flange 46 and being formed with an annular inner shoulder 47 located to overlay flange 19 and to define a seat for the ends of the arms of a spider frame 48 secured to and supporting the coils of the element 12.

Figure 6:
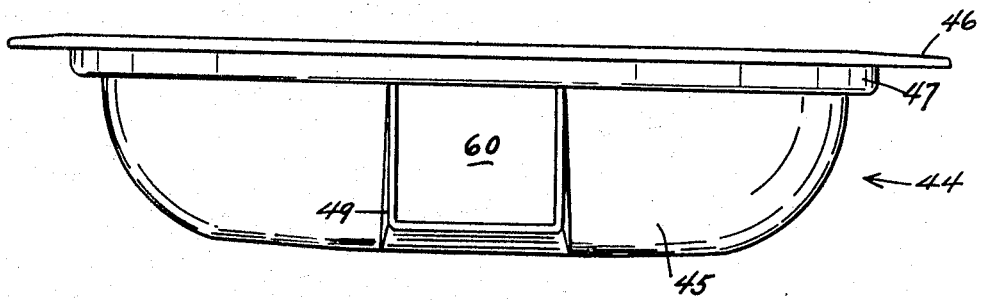
FIGURE 6 is an elevational view, to a somewhat reduced scale, taken substantially on the line 6—6 of FIGURE 5.
Figure 7:
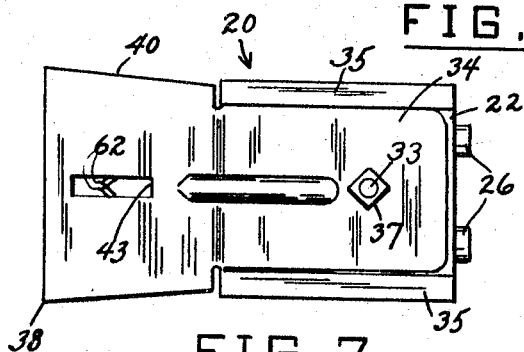
FIGURE 7 is an enlarged bottom plan view of the socket employed in the assembly of FIGURE 1.

The bowl 45 is formed with a side opening 60 bordered at its sides and bottom by a collar or flange 49 which projects radially from the bowl, said collar 49 being substantially rectangular in shape, as shown in FIGURE 6, and being dimensioned to slidably engage inside the guide channel 38 when the pan is lowered, in proper registry of opening 60 with said guide channel, into the heater element aperture of the panel 17. Thus, in inserting the pan, it is held over the aperture and is rotated until collar 49 is in vertical registry with channel 38, after which the pan may simply be dropped into the heating element aperture, allowing collar 49 to drop into channel 38, as indicated in FIGURE 5.

The heating element 12 may then be installed by passing the end portions 14, 14 through the opening 60 and past the opposite sides of the grounding separator member 42, the blades 15 being thus guided through the openings 39 and into contacting engagement with the female contact springs 24. The ends of the arms of spider frame 48 seat themselves on the shoulder 47, thus supporting the heating element 12 in proper operating position over the reflector bowl 45.

The heating element 12 and reflector 44 may be easily removed from panel 17 by following a procedure reverse to that above described.

It will be seen from FIGURE 5 that the guide channel 38 projects radially inwardly a substantial distance beyond the inner edge of flange 19 and that the collar 49 is short enough to clear hook flange 29 when the reflector pan is dropped into place. Thus, the collar 49 can seat in the guide channel 38, assuring positive registration of the opening 60 with the inner end of socket 20.

While a specific embodiment of an improved heating unit assembly for an electric stove has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an electric stove, a top panel formed with a heating element aperture, a socket secured beneath the panel adjacent to the edge of the aperture, a guide member secured to said socket and extending inwardly from beneath the edge of the aperture, a reflector pan receivable in said aperture, said pan having a side opening registerable with said socket, indexing means on the pan interengageable with said guide member to orient the pan with said side opening in registry with said socket, a coiled heating element, means to support the heating element in the upper portion of the pan, and terminal end portions on said coiled heating element engageable through said side opening and receivable in said socket.

2. In an electric stove, a top panel formed with a heating element aperture, a socket secured beneath the panel adjacent to the edge of the aperture, a guide member secured to said socket and extending inwardly from beneath the edge of the aperture, a reflector pan receivable in said aperture, flange means on the top rim of the pan supportingly engageable on the margin of said aperture, said pan having a side opening located below said flange means and being registerable with said socket, indexing means on the pan interengageable with said guide member to orient the pan with said side opening in registry with said socket, a coiled heating element, means to support the heating element in the upper portion of the pan, and terminal end portions on said coiled heating element engageable through said side opening and receivable in said socket.

3. In an electric stove, a top panel formed with a heating element aperture, a socket secured beneath the panel adjacent to the edge of the aperture, a guide member secured to said socket and extending inwardly from beneath the edge of the aperture, a substantially circular reflector pan rotatably receivable in said aperture, flange means on the top rim of the pan supportingly engageable on the margin of said aperture, said pan having a side opening located below said flange means and being registrable with said socket, indexing means on the pan interengageable with said guide means to orient the pan with said side opening in registry with said socket, a coiled heating element, means to support the heating element in the upper portion of the pan, and terminal end portions on said coiled heating element engageable through said side opening and receivable in said socket.

4. In an electric stove, a top panel formed with a heating element aperture, a socket secured beneath the panel adjacent to the edge of the aperture, an upwardly facing substantially channel-shaped guide member secured to said socket and extending inwardly from beneath the edge of the aperture, a reflector pan receivable in said aperture, said pan having a side opening registrable with said socket, indexing flange means on the pan at the edge of said side opening interengageable with said guide member to orient the pan with said side opening in registry with said socket, a coiled heating element, means to support the heating element in the upper portion of the pan, and terminal end portions on said coiled heating element engageable through said side opening and receivable in said socket.

5. The structure of claim 4, and an upstanding conductive grounding member on said channel-shaped guide member located so as to be snugly receivable between said terminal end portions when said end portions are inserted in the socket.

6. The structure of claim 4, and an upstanding longitudinally elongated substantially oval metal grounding spring secured on said channel-shaped guide member and being located so as to be resiliently receivable between said terminal end portions when said end portions are inserted in the socket.

7. In an electric stove, a top panel formed with a heating element aperture, a socket secured beneath the panel adjacent to the edge of the aperture, an upwardly facing substantially channel-shaped guide member secured to said socket and extending inwardly from beneath the edge of the aperture, a substantially circular reflector pan rotatably receivable in said aperture, flange means on the top rim of the pan supportingly engageable on the margin of said aperture, said pan having a side opening located below said flange means and being registrable with said socket, indexing flange means on the pan at the edge of said side opening interengageable with said guide member to orient the pan with said side opening in registry with said socket, a coiled heating element, means to support the heating element in the upper portion of the pan, and terminal end portions on said coiled heating element engageable through said side opening and receivable in said socket.

8. In an electric stove, a top panel formed with a substantially circular heating element aperture, a socket, means to secure said socket in a substantially radially extending position beneath the margin of said aperture, an upwardly facing channel-shaped guide member secured to the bottom of said socket and extending radially inwardly beneath said aperture, a generally circular reflector pan rotatably receivable in said aperture and having a side opening registrable with said socket, a marginal flange on said side opening receivable in said guide member to register the side opening with the socket, a coiled heating element, means to support said heating element in the upper portion of the pan, and outwardly extending terminal end portions on said coiled heating element engageable through said side opening and receivable in said socket.

9. The structure of claim 8, and wherein said guide member flares outwardly in shape from said socket toward said side opening.

10. The structure of claim 8, and an upstanding resilient longitudinally elongated metal sleeve secured on the bottom wall of said channel-shaped guide member and being resiliently receivable between said terminal end portions.

11. In an electric stove, a top panel formed with a substantially circular heating element aperture, a socket, means to secure said socket in a substantially radially extending position beneath the margin of said aperture, an upwardly facing channel-shaped guide member secured to the bottom of said socket and extending radially inwardly beneath said aperture, a generally circular reflector pan rotatably receivable in said aperture and having a side opening registrable with said socket, said guide member flaring outwardly in shape from said socket toward said side opening, a marginal flange on said side opening receivable in said guide member to register the side opening with the socket, a coiled heating element, means to support said heating element in the upper portion of the pan, outwardly extending terminal end portions on said coiled heating element engageable through said side opening and receivable in said socket, and an upstanding resilient longitudinally elongated metal sleeve secured on the bottom wall of said channel-shaped guide member and being resiliently receivable between said terminal end portions.

References Cited

UNITED STATES PATENTS

| | | | |
|---|---|---|---|
| 2,260,108 | 10/1941 | Wiegand et al. | 219—455 |
| 2,271,977 | 2/1942 | Hjelmgren | 219—455 |
| 2,725,456 | 11/1955 | Weyrick | 219—455 |
| 3,046,123 | 4/1966 | Ammerman et al. | 219—451 |

RICHARD M. WOOD, *Primary Examiner.*

L. H. BENDER, *Assistant Examiner.*